United States Patent
Park et al.

(10) Patent No.: US 10,381,031 B2
(45) Date of Patent: Aug. 13, 2019

(54) ADAPTIVE DISTURBANCE REJECTION USING DEAD ZONE FILTER

(71) Applicants: Seagate Technology LLC, Cupertino, CA (US); Industry-Academic Cooperation Foundation, Yonsei University, Seoul (KR)

(72) Inventors: Sung-Won Park, Yongin (KR); Sung-Yong Lim, Seoul (KR); Jae-Seong Lee, Seoul (KR); Hyunseok Yang, Seoul (KR)

(73) Assignees: Seagate Technology LLC, Cupertino, CA (US); Industry-Academic Cooperation Foundation, Yonsei University, Seoul (KR)

(*) Notice: Subject to any disclaimer, the term of this patent is extended or adjusted under 35 U.S.C. 154(b) by 116 days.

(21) Appl. No.: 14/675,122

(22) Filed: Mar. 31, 2015

(65) Prior Publication Data
US 2016/0293208 A1    Oct. 6, 2016

(51) Int. Cl.
*G11B 5/596* (2006.01)
*G11B 5/55* (2006.01)
*G11B 5/58* (2006.01)

(52) U.S. Cl.
CPC ...... *G11B 5/59694* (2013.01); *G11B 5/59622* (2013.01); *G11B 5/5526* (2013.01); *G11B 5/5582* (2013.01); *G11B 5/5586* (2013.01); *G11B 5/58* (2013.01); *G11B 5/596* (2013.01)

(58) Field of Classification Search
None
See application file for complete search history.

(56) References Cited

U.S. PATENT DOCUMENTS

| | | | |
|---|---|---|---|
| 4,604,681 A | 8/1986 | Sakashita | |
| 4,914,564 A | 4/1990 | Surauer et al. | |
| 5,042,752 A | 8/1991 | Surauer et al. | |
| 6,094,602 A | 7/2000 | Schade, III | |
| 6,138,244 A | 10/2000 | Jin et al. | |
| 6,950,270 B2 | 9/2005 | Lyle et al. | |
| 6,950,741 B2 | 9/2005 | Ishikawa et al. | |
| 7,253,987 B1* | 8/2007 | Shim | G11B 5/5552 360/77.02 |
| 7,260,463 B2 | 8/2007 | Yasui et al. | |
| 7,406,820 B2 | 8/2008 | Critchley et al. | |
| 7,535,192 B2 | 5/2009 | Takaishi | |
| 8,532,847 B1 | 9/2013 | Andoh | |
| 8,630,850 B2 | 1/2014 | Suzuki et al. | |
| 2004/0080860 A1 | 4/2004 | Inaji et al. | |
| 2007/0183076 A1 | 8/2007 | Baugh et al. | |
| 2010/0328810 A1* | 12/2010 | Yoneda | G11B 5/59622 360/75 |
| 2013/0106336 A1* | 5/2013 | Sonoda | G05B 19/404 318/624 |

* cited by examiner

*Primary Examiner* — Brian M Butcher
(74) *Attorney, Agent, or Firm* — Hall Estill Attorneys at Law

(57) ABSTRACT

Apparatus and method for disturbance rejection in a control system. In some embodiments, a controller is adapted to position a control object. A disturbance observer generates a disturbance compensation value which is applied to reduce position error resulting from application of mechanical disturbance to the control object. The disturbance observer includes an adaptive filter with at least one dead zone providing a pass-through response with a scalar gain of less than one.

20 Claims, 5 Drawing Sheets

ADAPTIVE DISTURBANCE REJECTION USING DEAD ZONE FILTER

SUMMARY

Various embodiments of the present disclosure are generally directed to an apparatus and method for disturbance rejection in a control system.

In some embodiments, a controller is adapted to position a control object. A disturbance observer generates a disturbance compensation value which is applied to reduce position error resulting from application of mechanical disturbance to the control object. The disturbance observer includes an adaptive filter with at least one dead zone providing a pass-through response with a scalar gain of less than one.

In further embodiments, a data storage device has a data read/write transducer adjacent a rotatable data recording medium. An actuation mechanism supports the transducer and is configured to move the transducer with respect to the medium. A servo controller is configured to generate an initial input signal for the actuation mechanism responsive to position error of the transducer. A disturbance observer generates a disturbance compensation value which is combined with the initial input signal to form a modified input signal which is applied to the actuation mechanism to adjust the position of the control object. The disturbance compensation value reduces position error resulting from application of mechanical disturbance to the data storage device. The disturbance observer includes an adaptive filter with at least one dead zone providing a pass-through response with a scalar gain of less than one.

In further embodiments, a method includes positioning a control object using a controller, determining a position error of the control object, and generating a disturbance compensation value responsive to application of mechanical disturbance to the control object. The disturbance compensation value is generated using an adaptive filter with at least one dead zone providing a pass-through response with a scalar gain of less than one. Once generated, the disturbance compensation value is applied to reduce the position error of the control object.

These and other features and advantages which may characterize various embodiments of the present disclosure can be understood in view of the following detailed discussion and the accompanying drawings.

DETAILED DESCRIPTION

Figure 1:
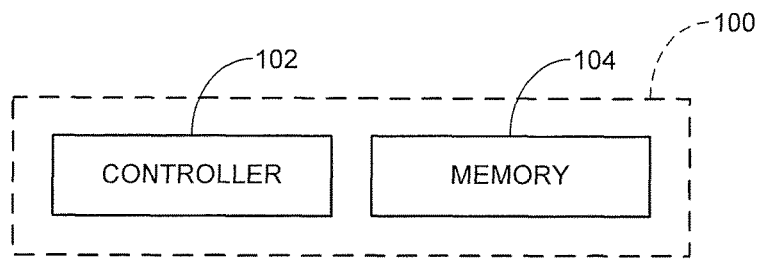
FIG. 1 provides a functional block representation of a data storage device in accordance with various embodiments of the present disclosure.

Various embodiments of the present disclosure are generally directed to adaptive disturbance rejection in a control system, such as but not limited to a servo control system in a data storage device.

Control systems can position a control object using closed loop sensing and actuation. One application that uses complex positioning control solutions is a servo control loop in a hard disc drive (HDD) data storage device. Such servo control loops are operated to controllably position a read/write transducer adjacent tracks on an adjacent rotatable magnetic recording disc in order to facilitate the transfer of data between the disc and a host device. Feedback positioning data are obtained from servo data stored on the disc surface and used to correct transducer position error.

Adaptive disturbance observer (DOB) systems can be employed in disc drive servo loops and other forms of control systems. An adaptive DOB generally operates to compensate for position errors induced by the application of mechanical disturbances (e.g., noise, vibration, mechanical shocks) to the control object. Adaptive DOB circuits sense the disturbances and apply signal processing such as in the form of adaptive filtering to reduce the measured position error to a minimum level.

Disturbance rejection solutions can be difficult to implement in many modern applications due to large, unpredictable disturbances that arise from a variety of factors. For example, in the context of a portable consumer electronic device such as a laptop computer, disturbances can arise from the portable nature of the environment in which the device is used (e.g., a vibratory environment such as on an airplane or in a motor vehicle). Unpredictable disturbances can further be generated by the device itself, such as vibrations caused by high powered audio speakers playing music or other audio content.

In cloud computing and other multi-device storage environments, the aggregation of data storage devices into multi-device enclosures can subject the devices to mechanical disturbances from adjacent storage devices (e.g., rotational and translational vibration effects). Disturbances can further be induced from other sources such as high performance cooling fans, power supplies, etc.

Current generation DOB designs can use an adaptive H-filter that outputs disturbance compensation values that are injected into the servo loop to reduce the effects of the disturbance events. While operable, one limitation associated with such designs is reduced stability margin under different disturbance environments, particularly those subjected to large changes in the disturbance profile.

Accordingly, various embodiments of the present disclosure are generally directed to an apparatus and method for disturbance rejection in a control system, such as but not limited to a servo control loop in a data storage device.

As explained below, in some embodiments a control object is controlled by a closed loop positioning (control) system. During operation, the control object is subjected to the application of external mechanical disturbances having various frequency components.

A disturbance observer generates a disturbance compensation value which is applied to reduce position error resulting from application of the mechanical disturbance to the control object. The disturbance observer comprises an adaptive filter with at least one dead zone providing a pass-through response with a scalar gain of less than one. Other features can include a disturbance estimator that adaptively selects the dead zone gain and/or boundaries based on disturbances encountered during operation.

These and other features of various embodiments of the present disclosure can be understood beginning with a review of FIG. 1 which provides a functional block representation of an exemplary data storage device 100. The data storage device 100 is shown to include a controller 102 and a memory module 104.

The controller 102 provides top-level control of the device 100 and directs communications and data transfers with a host device (not separately shown in FIG. 1). The controller 102 may be realized in hardware, software and/or firmware. The memory module 104 can take a variety of forms, and includes one or more forms of data storage memory to store user data supplied by the host device.

Figure 2:
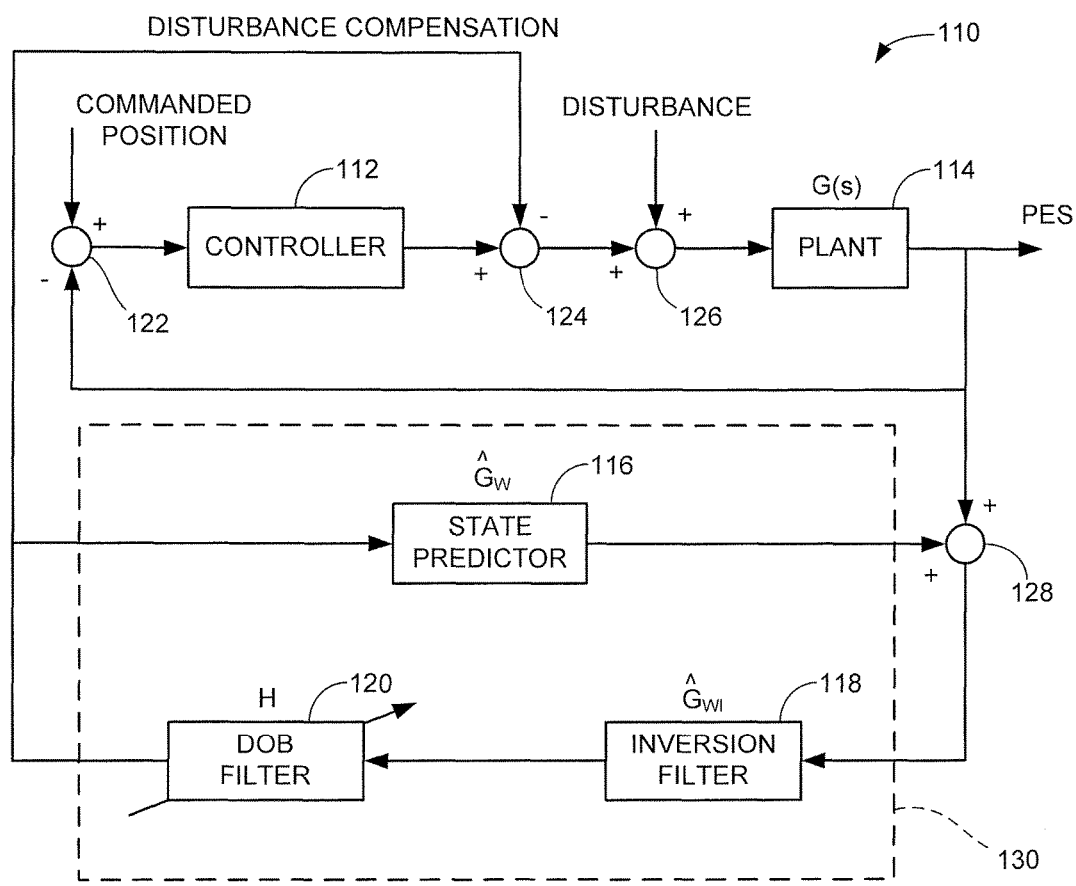
FIG. 2 is a functional block diagram of the data storage device of FIG. 1 in accordance with some embodiments.

FIG. 2 is a block diagram of selected aspects of the device 100 of FIG. 1 in accordance with some embodiments. A closed loop positioning system (control system) 110 is used to position a data read/write transducer adjacent tracks on a rotating medium of the device 100.

The control system 110 includes a servo controller 112, a plant 114, a state predictor block 116, an inversion filter 118 and a disturbance observer (DOB) filter 120. Summing blocks 122, 124, 126 and 128 combine the various signals as described below. It will be appreciated that the control system 110 can be realized in hardware, software and/or firmware in a variety of ways. Other elements may be included as well including one or more disturbance sensors, etc., but such have been omitted for simplicity of illustration.

Generally, the controller 112 outputs a control input for use by the plant 114 to position the control object. The plant 114 represents the physical aspects of the control object and actuation mechanism. In a hard disc drive (HDD) environment, the plant may include a voice coil motor (VCM), VCM driver circuitry, a moveable actuator that positions the transducer responsive to the VCM inputs, and readback circuitry that uses the transduced readback signals from servo positioning data on the medium to generate a position signal. Other forms of plants can be used, including multi-input-multi-output (MIMO) control systems that use microactuators or other actuation stages to position the transducer or other control object.

The position signal output from the plant 114 may take the form of a position error signal (PES) indicative of position error with respect to a target position. Feedback position data are supplied to the controller so that, over a succession of servo intervals (samples), the control object (transducer) is nominally caused to follow a desired position/trajectory.

An external disturbance signal is added to the control input by summing block 126. This generally represents the application of mechanical disturbances to the system that induce a corresponding error component in the position of the control object. It is contemplated, albeit not necessarily required, that the disturbance profile will be time varying, multi-frequency and largely unpredictable so that different frequency spectra may be applied to the device over time and under different operational conditions.

A disturbance observer (DOB) compensation module 130 is provided to reduce the effects of the disturbance upon the system. The DOB compensation module 130 includes the state predictor 116, inversion filter 118 and DOB filter (H-filter) 120. Other circuitry may be included in the DOB compensation module as well. Generally, the module injects a disturbance compensation signal (as shown via summing block 124) in an effort to cancel out, or at least reduce, the effects of the disturbance at summing block 126.

The state predictor 116 provides a nominal closed-loop vibration transfer function $\hat{G}_W$ (also referred to as DSF). The inversion filter provides an inverse function $\hat{G}_{Wi}$ (for example, a ZPET inversion, and can be characterized as Q/DSF). The DOB filter 120 provides an H filter response that is self-tuned and includes a specially configured adaptive dead zone as discussed below to reduce the effects of the injected disturbances and drive PES to a minimum. The overall vibration transfer function $DSF_{DOB}$ for the DOB module can be stated as:

$$DSF_{DOB} = \frac{G_W(1 - \hat{G}_W \hat{G}_{Wi} H)}{1 - (\hat{G}_W - G_W)\hat{G}_{Wi} H} \quad (1)$$

To explain the use and configuration of the dead zone aspects of the DOB filter 120, it will be helpful to first briefly discuss limitations often encountered with traditional adaptation schemes that use H filter configurations. The following model uses a least mean square (LMS) approach in an effort to reduce a position error ($\varepsilon$) to be a minimum value (e.g., zero):

$$y_W = \theta^T \phi(k) \quad (2)$$

$$\varepsilon(k+1) = e_W(k+1) - \theta(k)^T \phi(k) \quad (3)$$

$$\theta(k+1) = \theta(k) + \gamma \phi(k) \varepsilon(k-1) \quad (4)$$

where $y_W$ is estimated disturbance, $\theta^T$ is an adaptive variables vector of the DOB filter, k are servo samples, $\phi(k)$ are modified position error inputs to the DOB filter, $\theta^T \phi(k)$ is estimated position from the DSF, $e(k+1)$ is the measured position error and $\varepsilon(k+1)$ is the estimated position error. The model is generally operable to reduce disturbance effects, but does not guarantee stable operation since external disturbances can provide significant increases in error sensitivity function response.

Accordingly, a dead zone is incorporated into the DOB filter 120 to address these and other instabilities of the loop. The dead zone is a range of operation of the filter in which a substantially constant signal pass-through response is given with a selected scalar gain (e.g., K<1). The dead zone features dynamic adjustment of the zone boundaries based on the magnitude of the measured position error $e_W$. Since the measured position error generally excludes the effect of the injected compensation value $y_W$, the dead zone boundary can be determined by the level of position error before injecting the compensation from the DOB loop.

Figure 3:
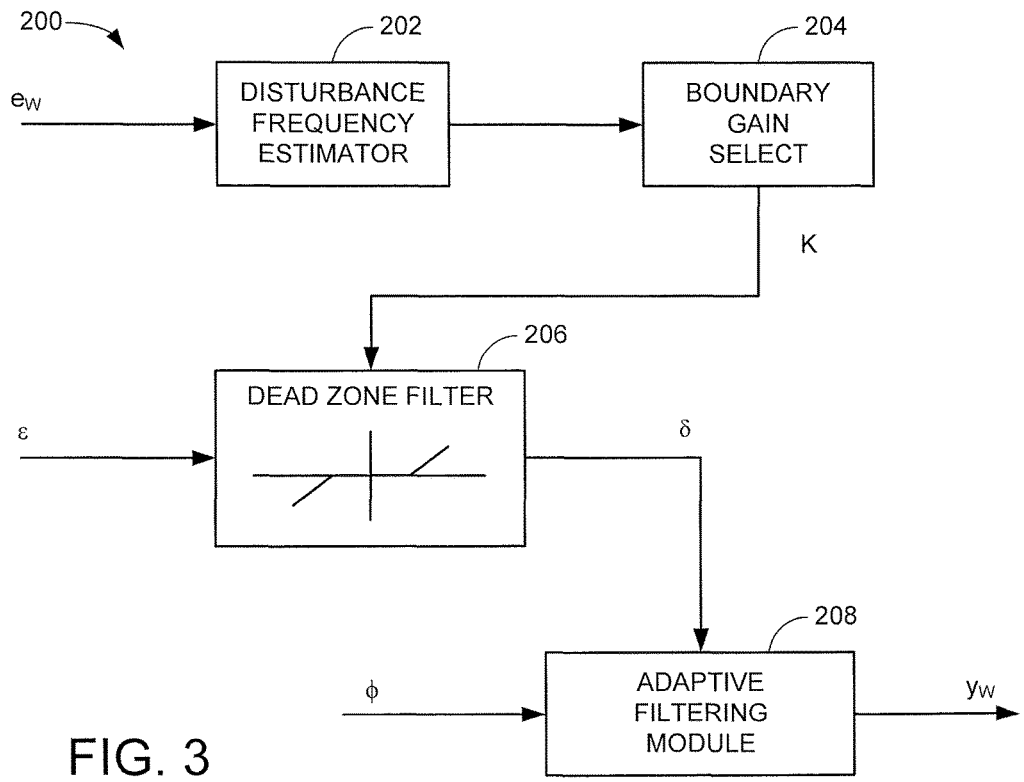
FIG. 3 is a functional block diagram of the disturbance observer (DOB) filter of FIG. 2 in accordance with some embodiments.

FIG. 3 shows a DOB filter 200 in accordance with some embodiments. The filter 200 generally corresponds to the DOB filter 120 in FIG. 2 and includes a disturbance frequency estimator block 202, a boundary gain select block 204, a dead zone filter 206 and an adaptive filtering module 208.

The filter 200 can be defined as setting a proportional gain K to the measured position error $e_W$ as follows:

$$\delta(k) = \varepsilon(k) \pm K e_W(k)$$

if $|\varepsilon(k)| > |K e_W(k)|$; else $$\delta(k) = 0 \quad (5)$$

where $\delta$ is the output of the dead zone filter. The bounds and scalar gain are adaptively selected based on the input measured position error $e_W$. More specifically, as shown by the functional representation in FIG. 3, the disturbance frequency estimator block 202 continuously evaluates the measured position error and supplies inputs to the boundary gain select block 204. This provides the dead zone filter 206 with appropriate boundary and gain values. The adaptive filtering module 208 thereafter applies LMS based H-filter adaptive filtering as modified by the dead zone. Operation of the circuitry of FIG. 3 can be modeled as follows:

$$y_W = \theta^T \phi(k) \quad (6)$$

$$\varepsilon(k+1) = e_W(k+1) - \theta(k)^T \phi(k) \quad (7)$$

$$\theta(k+1) = \theta(k) + \gamma \phi(k) \delta(k+1) \quad (8)$$

where $\delta(k+1)$ is governed by equation (5) above based on the then-existing measured and estimated position values $e_W(k)$ and $\varepsilon(k)$ and the selected K value.

Figure 4:
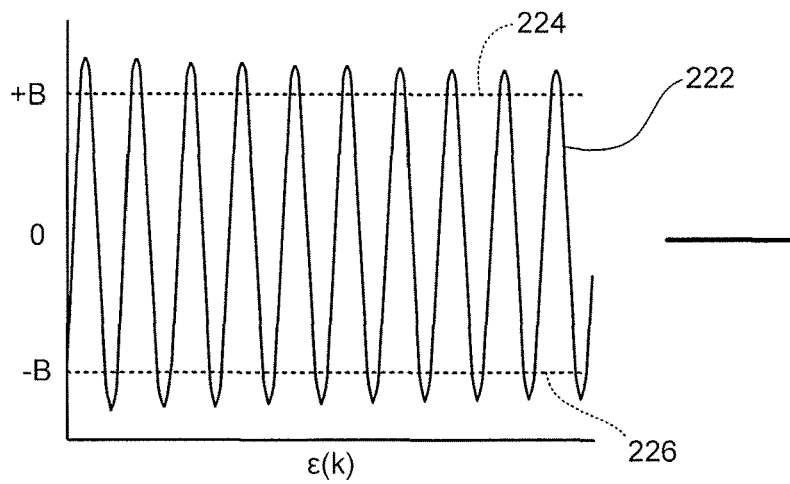
FIG. 4 is a schematic representation of a dead zone filter circuit that uses fixed boundaries.
Figure 4:
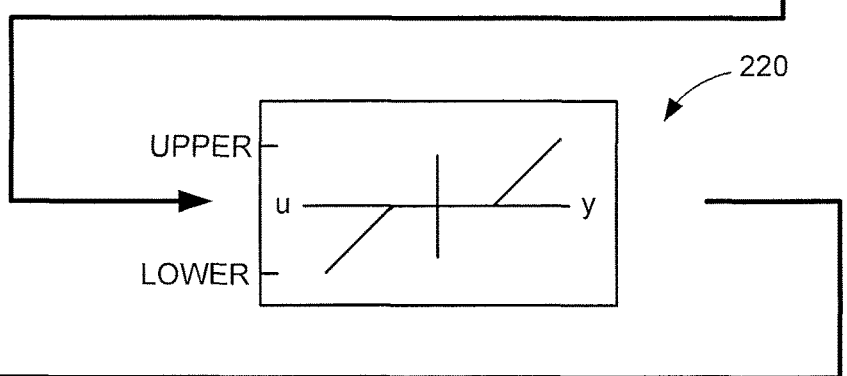
Figure 4:
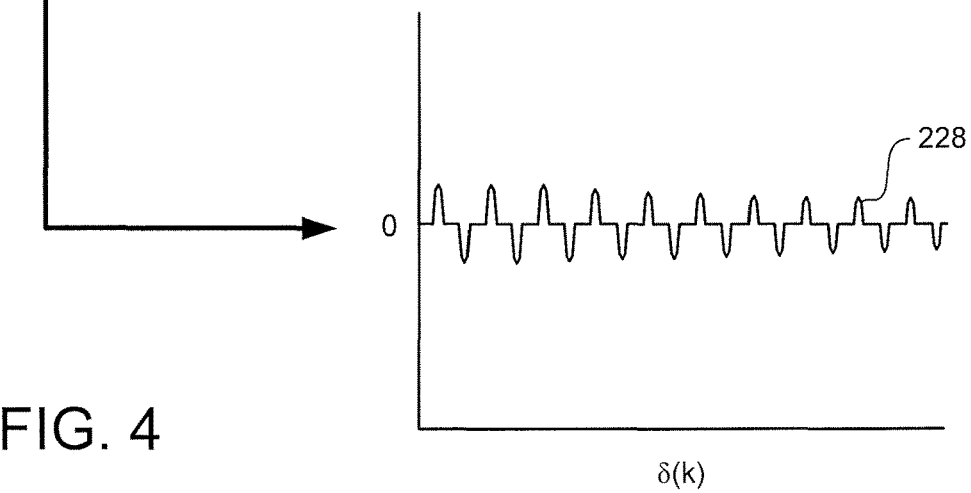
Figure 5:
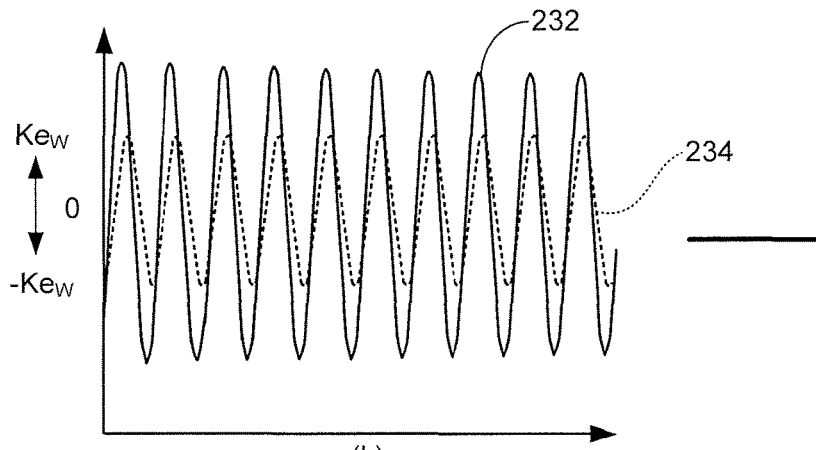
FIG. 5 is a schematic representation of a dead zone filter circuit that uses dynamic boundaries.
Figure 5:
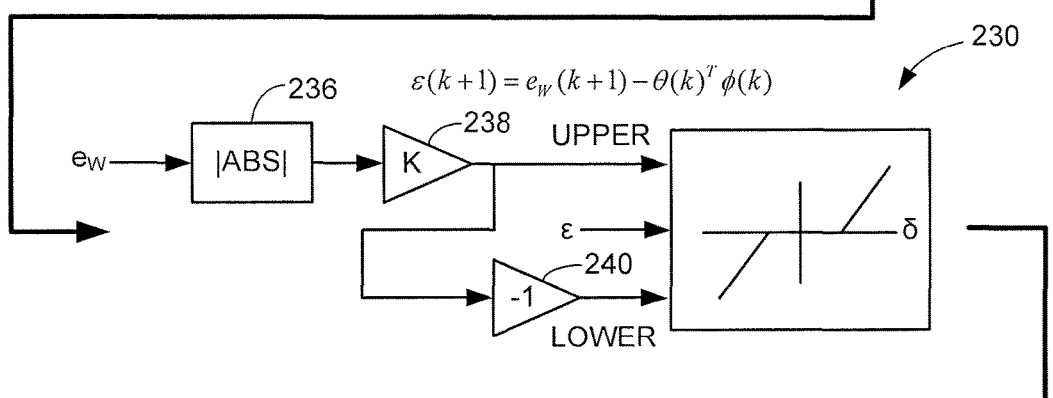
Figure 5:
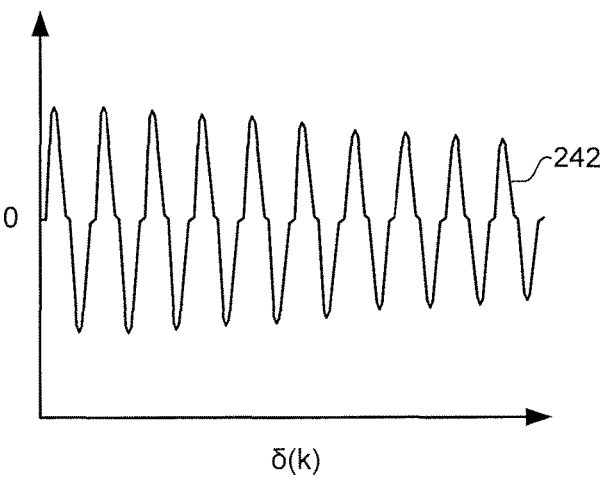

Operation of the dead zone filter can be better understood with a review of FIGS. 4-5. FIG. 4 schematically represents a dead zone filter response for a dead zone filter circuit 220 that uses fixed boundaries (+B, −B). Input estimated position error curve 222 represents the estimated position error $\varepsilon(k)$ obtained by the system. The fixed boundaries +B and −B, represented by broken lines 224 and 226, are used by the filter circuit 220 to generate a filter output signal 228 as filter output $\delta(k)$.

FIG. 5 schematically represents another dead zone filter response for a dead zone filter circuit 230 that uses dynamic boundaries. As before, input estimated position error curve 232 represents estimated position error $\varepsilon(k)$. A dynamic boundary curve 234 does not remain fixed over time, but instead varies with estimated position error $\varepsilon(k)$ over a range from $+Ke_W$ to $-Ke_W$ which, as discussed above, are formed from the product of the gain value K and the measured position error $e_W$.

The filter circuit 230 includes an absolute value (|ABS|) block 236 which operates on the input measured position error $e_W$, gain block 238 which applies gain K to form the upper bound limit $+Ke_W$, and inverter block 240 to provide the lower bound limit $-Ke_W$. Filter output signal 242 represents the output $\delta(k)$ of the filter.

It follows from FIG. 5 that the input to the dead zone filter is the estimated position error $\varepsilon(k)$, the dead zone boundary limits are $\pm Ke_W$, and the output of the dead zone filter is $\delta(k)$. The dead zone is dependent upon the $e_W$ signal and does not have a nominal center frequency. With reference again to FIG. 3, once the disturbance frequency estimator 202 determines its frequency, an appropriate boundary gain K is selected and the dead zone boundary is applied as the product of K and $e_W$. The output $\delta$ from the filter is generated accordingly and applied to the LMS adaptation logic to adjust the servo loop.

Figure 6:
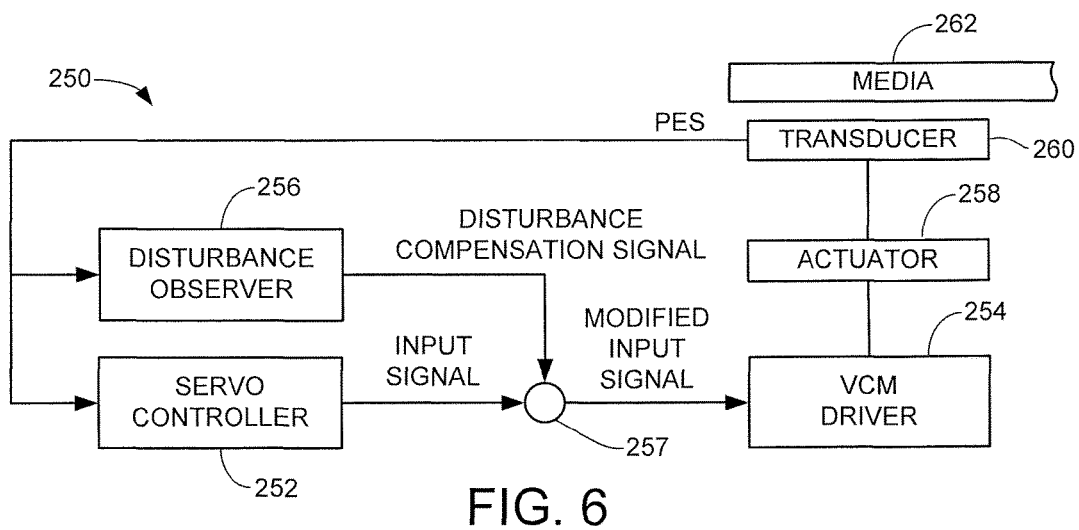
FIG. 6 is a functional block diagram of a servo control loop of the data storage device of FIG. 1 in accordance with some embodiments.

FIG. 6 is a functional block diagram of a servo loop 250 of the storage device 100 of FIG. 1 utilizing a DOB filter as set forth in FIG. 3. A servo controller 252 generates an initial input signal for a voice coil motor (VCM) driver 254. A disturbance observer 256 provides a disturbance compensation signal which is combined (via summing junction 257) with the input signal from the servo controller 252 to provide a modified input signal.

The modified input signal is used by the VCM driver 254 to apply drive current to a VCM of an actuator 258, which in turn actuates (moves) a transducer 260 adjacent a corresponding storage medium 262. A position error signal (PES) or other position signal is fed back to the servo controller 252 and the disturbance observer 254. In this way, the disturbance observer operates in parallel to compensate for disturbance using a dead zone as configured in FIG. 3. For reference, the VCM driver 254 and actuator 258 may be collectively referred to as an actuation mechanism. Other forms of actuation mechanisms and control objects are envisioned and can be used as desired, including multi-stage actuators that use one or more fine control actuation mechanisms such as a microactuator.

Figure 7:
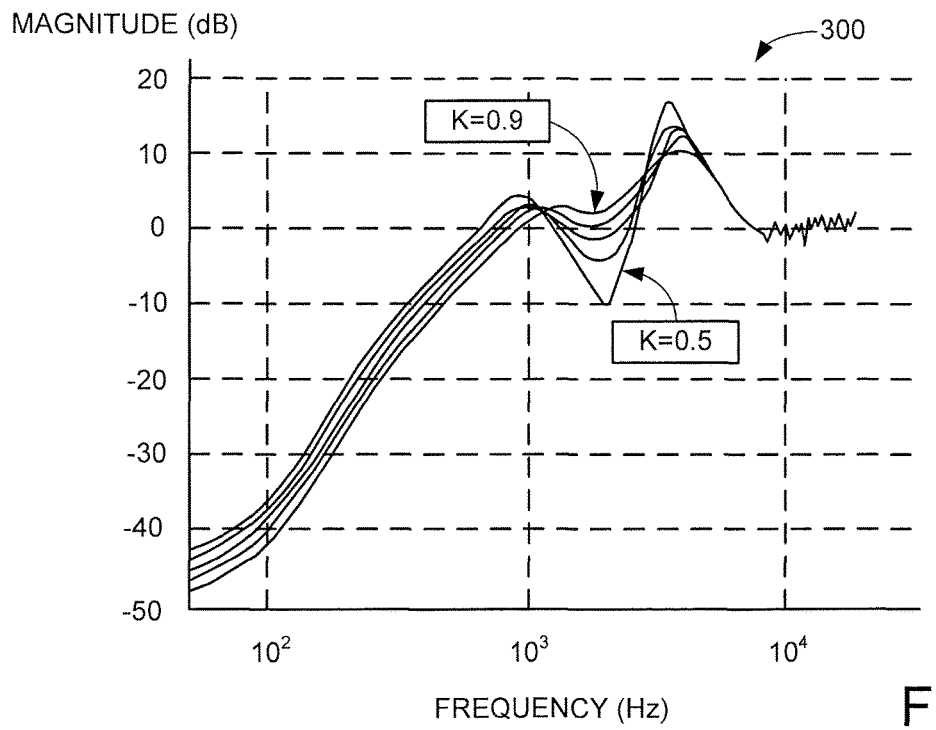
FIG. 7 is a graphical representation of an error sensitivity function (ESF) for the disturbance observer using different adaptive gain values.

FIG. 7 graphically represents a class of adapted error sensitivity function (ESF) curves 300 for the DOB filter 200 of FIG. 3. The curves represent different dead-zone conditions for values of K of nominally 0.5, 0.6, 0.7, 0.8 and 0.9 with an injected single frequency disturbance of nominally 2000 Hz (2 kHz). The different values of K show different sensitivity margin for the frequency range of interest.

Because of the adaptive nature of the DOB filter 200, it will be understood that the dead zone is not fixed, but rather, the dead zone location (e.g., nominally centered around 2 kHz) will adjust in both boundary and gain as other frequency disturbances as applied (e.g., 500 Hz, 1500 Hz, 2300 Hz, etc.). The scalar gain, while less than 1.0, will be set to the proper value based on the target stability margin and disturbance signature of the servo system.

The introduction of a relatively large input disturbance of a selected frequency (or relatively narrow frequency range) will be detected by the estimator block 202 and, provided the component exhibits sufficient persistence and magnitude over multiple successive samples, the estimator will select appropriate boundary and gain values to implement a dead zone in the filtering to compensate.

In some cases, one or both of the boundary and gain values will be adaptively adjusted during continued application of the dead zone. With regard to different disturbance frequencies, the system identifies the frequency contents, selects an appropriate gain K to adjust the dead zone boundary and the dead zone filter operates to generate the output delta value. Hence, unlike a notch filter which generally removes a narrow frequency range of interest (e.g., a 60 Hz power noise signal, etc.), the dead band zone filter 206 provides pass through at reduced amplitude for the appropriate frequency interval.

While a fixed amount of scalar gain K has been described, other configurations are contemplated including different scalar gains for different frequency ranges to further equalize minimum stability margin for various disturbance spectra.

Figure 8:
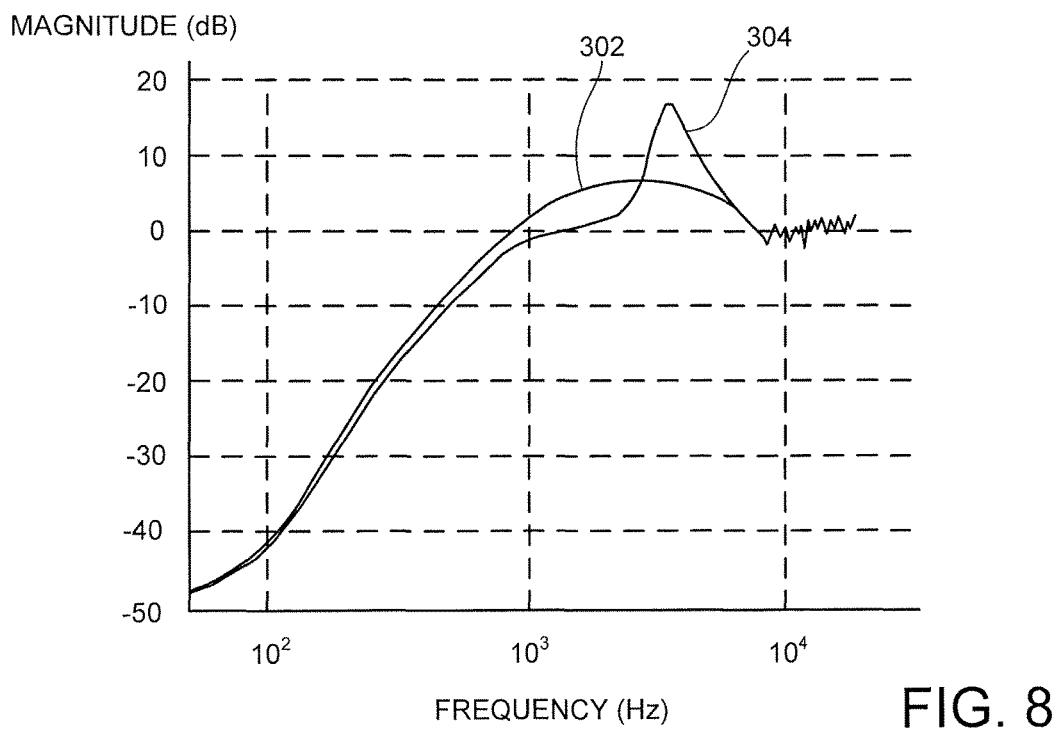
FIG. 8 is a graphical representation of an ESF for the disturbance observer set for a selected gain and dead zone frequency range.

FIG. 8 is another graphical representation of error sensitivity function (ESF) curves, with curve 302 representing the base controller response and curve 304 representing the response with the adaptive dead zone filtering approach supplied by the filter 200. The dead zone in FIG. 6 is proximate a disturbance range of around 1500 Hz.

It will now be appreciated that the various embodiments of the present disclosure provide a disturbance observer (DOB) in a control system used to position a control object, such as but not limited to a servo control system in a data storage device. An adaptive H-filter of the DOB is provided with a dead zone and adaptive selection logic that selects boundary and scalar gain values to provide pass through range to enhance stability margin. More than one dead zone can be applied depending on the frequency spectra of the applied disturbance.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
a control object coupled to an actuation mechanism;
a controller adapted to position the control object by generating an initial input signal responsive to position error of the control object;
a disturbance observer circuit which generates a disturbance compensation value to reduce position error resulting from application of mechanical disturbance to the control object, the disturbance observer circuit comprising an adaptive filter circuit with at least one dead zone providing a pass-through response with a scalar gain of less than one, the scalar gain selected responsive to a target stability margin and a disturbance signature associated with the control object; and
a summing block adapted to combine the initial input signal with the disturbance compensation value to form a modified input signal, the modified input signal applied to the actuation mechanism to adjust the position of the control object.

2. The apparatus of claim 1, wherein the adaptive filter circuit comprises an H-filter that uses least mean squares (LMS) processing to reduce the position error of the control object.

3. The apparatus of claim 1, wherein the disturbance observer circuit further comprises a disturbance frequency estimator block which selects the scalar gain of the dead zone responsive to measured position error of the control object.

4. The apparatus of claim 1, wherein the disturbance observer circuit comprises a dead zone filter circuit that generates a boundary for the dead zone that varies over time in relation to changes in measured position error.

5. The apparatus of claim 1, wherein the control object is a data read/write transducer in a data storage device, and the controller is adapted to position the data read/write transducer adjacent concentric tracks defined on a rotatable data recording medium.

6. The apparatus of claim 1, wherein the actuation mechanism comprises an actuator which supports the control object.

7. The apparatus of claim 1, wherein the position error comprises a position error signal of a read/write transducer in a data storage device.

8. The apparatus of claim 1, wherein the disturbance observer circuit further comprises a state predictor block which defines a nominal closed-loop vibration transfer function and an inversion filter circuit which defines an inverse function of the state predictor block.

9. A data storage device, comprising:
a data read/write transducer adjacent a rotatable data recording medium;
an actuation mechanism supporting the transducer and configured to move the transducer with respect to the medium;
a servo controller configured to generate an initial input signal for the actuation mechanism responsive to position error of the transducer; and
a disturbance observer circuit which generates a disturbance compensation value which is combined with the initial input signal to form a modified input signal which is applied to the actuation mechanism to adjust the position of the transducer, the disturbance compensation value reducing position error resulting from application of mechanical disturbance to the data storage device, the disturbance observer circuit comprising an adaptive filter circuit with at least one dead zone providing a pass-through response with a scalar gain of less than one and a dead zone filter circuit that generates a boundary for the dead zone that varies over time in relation to changes in measured position error, the adaptive filter comprising an H-filter that uses least mean squares (LMS) processing of position error samples to reduce the position error of the control object.

10. The data storage device of claim 9, wherein the disturbance observer circuit further comprises a disturbance frequency estimator block which selects the scalar gain of the dead zone responsive to measured position error of the control object.

11. The data storage device of claim 9, wherein the scalar gain is a value selected responsive to a target stability margin.

12. A method comprising:
positioning a control object using a controller;
determining a position error of the control object;
generating a disturbance compensation value responsive to application of mechanical disturbance to the control object, the disturbance compensation value generated using an adaptive filter with at least one dead zone providing a pass-through response with a scalar gain of less than one, the scalar gain selected responsive to the determined position error of the control object; and
applying the disturbance compensation value to reduce the position error of the control object, the adaptive filter comprising an H-filter that uses least mean squares (LMS) processing of position error samples to reduce the position error of the control object.

13. The method of claim 12, wherein the control object is a data read/write transducer in a data storage device comprising a rotatable data recording medium, wherein the data read/write transducer is positioned adjacent concentric tracks defined on the rotatable data recording medium during a data transfer operation between the data storage device and a host device, wherein the data storage device is disposed in a multi-device enclosure, and wherein the mechanical disturbance comprises an operation of an adjacent data storage device within the multi-device enclosure.

14. The method of claim 12, wherein the generating step further comprises selecting a frequency boundary of the dead zone responsive to the measured position error of the control object.

15. The method of claim 12, further comprising generating a boundary for the dead zone that varies over time in relation to changes in measured position error of the control object.

16. The method of claim 12, wherein the control object is a data read/write transducer of a data storage device.

17. The data storage device of claim 9, wherein the data read/write transducer is controllably positioned adjacent concentric tracks on the rotatable data recording medium by the servo controller to transfer data between the tracks and a host device coupled to the data storage device.

18. The data storage device of claim 9, wherein the disturbance observer circuit further comprises a state predictor block which defines a nominal closed-loop vibration transfer function and an inversion filter circuit which defines an inverse function of the state predictor block.

19. The data storage device of claim 9, wherein the disturbance observer circuit further operates to select the scalar gain responsive to a target stability margin and a disturbance signature associated with the transducer.

20. The method of claim 12, wherein the scalar gain is further selected responsive to a target stability margin and a disturbance signature associated with the control object.

\* \* \* \* \*